US012001152B2

(12) United States Patent
Tamaki

(10) Patent No.: US 12,001,152 B2
(45) Date of Patent: Jun. 4, 2024

(54) TONER CHARGING STATE DETERMINATION METHOD AND IMAGE FORMING APPARATUS

(71) Applicant: KYOCERA Document Solutions Inc., Osaka (JP)

(72) Inventor: Kenichi Tamaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/147,207

(22) Filed: Dec. 28, 2022

(65) Prior Publication Data

US 2023/0213878 A1 Jul. 6, 2023

(30) Foreign Application Priority Data

Jan. 6, 2022 (JP) ................................. 2022-000911

(51) Int. Cl.
*G03G 15/08* (2006.01)

(52) U.S. Cl.
CPC ................................ *G03G 15/0848* (2013.01)

(58) Field of Classification Search
CPC .... G03G 15/0848-0855; G03G 15/1675-168; G03G 15/5054-5058; G03G 15/0131
See application file for complete search history.

(56) References Cited

U.S. PATENT DOCUMENTS 6,160,969 A * 12/2000 Ishigaki ............. G03G 15/5041 399/49
7,773,902 B2 * 8/2010 Takayanagi ........ G03G 15/1675 399/49
2020/0081384 A1 * 3/2020 Akashi .............. G03G 15/5054

FOREIGN PATENT DOCUMENTS

JP 2010019969 A 1/2010

* cited by examiner

*Primary Examiner* — Sevan A Aydin
(74) *Attorney, Agent, or Firm* — Alleman Hall & Tuttle LLP

(57) ABSTRACT

A processor causes a printing portion to execute test image transfer processing for transferring a plurality of test toner images onto an area outside a secondary transfer area on a surface of an intermediate transfer member, and secondary voltage stop processing for stopping a supply of a secondary transfer voltage. The processor acquires a plurality of first sensing densities. The processor causes the printing portion to execute the test image transfer processing and secondary voltage supply processing for supplying the secondary transfer voltage. The processor acquires a plurality of second sensing densities. The processor compares the plurality of first sensing densities and the plurality of second sensing densities to determine a state of a toner charging amount in each of the plurality of test toner images.

5 Claims, 3 Drawing Sheets

TONER CHARGING STATE DETERMINATION METHOD AND IMAGE FORMING APPARATUS

INCORPORATION BY REFERENCE

This application is based upon and claims the benefit of priority from the corresponding Japanese Patent Application No. 2022-000911 filed on Jan. 6, 2022, the entire contents of which are incorporated herein by reference.

BACKGROUND

The present disclosure relates to a toner charging state determination method for determining a state of a toner charging amount in a toner image transferred onto a surface of an intermediate transfer member, and to an image forming apparatus.

An image forming apparatus that uses electrophotography may form a color image on a sheet by a tandem system. In this case, the image forming apparatus develops a plurality of monochrome toner images of different colors on surfaces of a plurality of photoconductors, respectively.

Further, the image forming apparatus transfers the plurality of monochrome toner images respectively formed on the surfaces of the plurality of photoconductors onto a surface of an intermediate transfer member by an electrostatic force.

By transferring the plurality of monochrome toner images onto the surface of the intermediate transfer member while causing the toner images to overlap one another, the image forming apparatus forms a synthetic toner image as a color image on the surface of the intermediate transfer member.

Furthermore, the image forming apparatus transfers the synthetic toner image formed on the surface of the intermediate transfer member onto a sheet by an electrostatic force.

When a toner charging amount falls outside an appropriate range in the monochrome toner images respectively formed on the surfaces of the photoconductors, a transfer failure of the monochrome toner images from the respective photoconductors to the intermediate transfer member may occur. In addition, a transfer failure of the synthetic toner image from the intermediate transfer member to the sheet may also occur.

For example, it is known that in the image forming apparatus, a plurality of patch images having different densities are formed in the respective photoconductors (see, for example, Patent Document 1). In addition, the image forming apparatus is known to specify a toner charging amount based on a variation amount of a sensing value of a developing current when forming the plurality of patch images and a variation amount of sensing densities of the plurality of patch images.

SUMMARY

A toner charging state determination method according to an aspect of the present disclosure is a method of determining a toner charging state in an image forming apparatus including a printing portion which forms toner images on a sheet and a density sensing portion which senses a toner density. In a case where the printing portion includes a plurality of photoconductors, a plurality of primary transfer portions, an intermediate transfer member, and a secondary transfer portion, and in addition, the density sensing portion senses the toner density on a surface of the intermediate transfer member at a sensing position on a downstream side of a secondary transfer position in a rotation direction of the intermediate transfer member, the toner charging state determination method is adopted. The plurality of photoconductors rotate while carrying the toner images on surfaces thereof. The plurality of primary transfer portions respectively supply a primary transfer voltage to a plurality of primary transfer members opposing the plurality of photoconductors via the intermediate transfer member, to transfer the toner images formed on the surfaces of the plurality of photoconductors onto the intermediate transfer member. The intermediate transfer member rotates while carrying the toner images transferred from the plurality of photoconductors. The secondary transfer portion supplies a secondary transfer voltage to a secondary transfer member opposing the intermediate transfer member via the sheet at the secondary transfer position, to transfer the toner images formed on the surface of the intermediate transfer member onto the sheet. The toner charging state determination method includes causing, by a processor, the printing portion to execute test image transfer processing for transferring a plurality of test toner images from the surfaces of the plurality of photoconductors onto an area outside a secondary transfer area corresponding to a width of the secondary transfer member on the surface of the intermediate transfer member, and secondary voltage stop processing for stopping the supply of the secondary transfer voltage to the secondary transfer member when the plurality of test toner images pass through the secondary transfer position. The toner charging state determination method further includes acquiring, by the processor, a plurality of first sensing densities sensed by the density sensing portion when the plurality of test toner images that have passed through the secondary transfer position pass through the sensing position under a situation where the secondary voltage stop processing is being executed. The toner charging state determination method further includes causing, by the processor, the printing portion to execute the test image transfer processing and secondary voltage supply processing for supplying the secondary transfer voltage to the secondary transfer member when the plurality of test toner images pass through the secondary transfer position. The toner charging state determination method further includes acquiring, by the processor, a plurality of second sensing densities sensed by the density sensing portion when the plurality of test toner images that have passed through the secondary transfer position pass through the sensing position under a situation where the secondary voltage supply processing is being executed. The toner charging state determination method further includes comparing, by the processor, the plurality of first sensing densities and the plurality of second sensing densities to determine a state of a toner charging amount in each of the plurality of test toner images corresponding to the plurality of primary transfer portions.

An image forming apparatus according to another aspect of the present disclosure includes the printing portion, the density sensing portion, and the processor which realizes the toner charging state determination method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an embodied example of the present disclosure and does not limit the technical scope of the present disclosure.

An image forming apparatus 10 according to the embodiment is an apparatus that executes print processing using electrophotography. The print processing is processing of forming an image on a sheet 9. The sheet 9 is an image forming medium such as a printing sheet and a sheet-type resin member.

[Configuration of Image Forming Apparatus 10]

Figure 1:
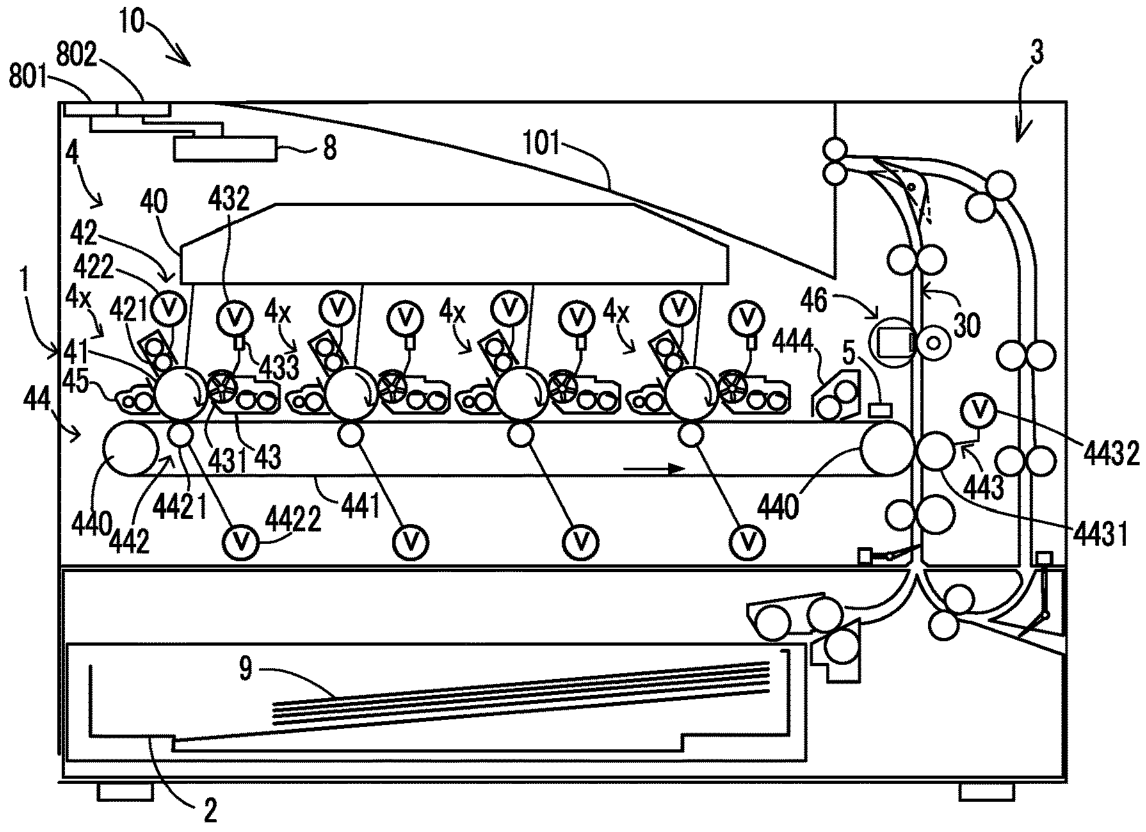
FIG. 1 is a configuration diagram of an image forming apparatus according to an embodiment.

As shown in FIG. 1, the image forming apparatus 10 includes a sheet storing portion 2, a sheet conveying path 30, a sheet conveying device 3, and a printing device 4. The image forming apparatus 10 also includes an operation device 801, a display device 802, and a control device 8.

The sheet conveying path 30, the sheet conveying device 3, the printing device 4, and the control device 8 are accommodated in a housing 1.

The sheet storing portion 2 stores sheets 9. The sheet conveying device 3 takes out a sheet 9 from the sheet storing portion 2 and feeds the sheet 9 to the sheet conveying path 30, and further conveys the sheet 9 along the sheet conveying path 30. The sheet conveying device 3 is an example of a conveying portion.

In addition, the sheet conveying device 3 discharges the sheet 9, on which an image has been formed, on a discharge tray 101 from the sheet conveying path 30.

The printing device 4 executes the print processing on the sheet 9 conveyed along the sheet conveying path 30. The printing device 4 forms a toner image on the sheet 9 conveyed along the sheet conveying path 30. In this embodiment, the printing device 4 is a tandem-type color printing device.

The toner image is an image that uses toner as developer. The toner is an example of granulated developer. The printing device 4 is an example of a printing portion which forms the toner image on the sheet 9.

The printing device 4 includes a plurality of image forming portions 4*x*, a laser scanning unit 40, a transfer device 44, and a fixing device 46. In this embodiment, the printing device 4 includes four image forming portions 4*x* corresponding to four colors of yellow, cyan, magenta, and black.

Each of the image forming portions 4*x* includes a drum-type photoconductor 41, a charging device 42, a developing device 43, a drum cleaning device 45, and the like.

In each of the image forming portions 4*x*, the photoconductor 41 rotates so that a surface of the photoconductor 41 is charged by the charging device 42. Further, the laser scanning unit 40 scans laser light so as to form an electrostatic latent image on the surface of the rotating photoconductor 41.

The laser scanning unit 40 is an example of a latent image forming portion that forms the electrostatic latent image on the charged surface of the photoconductor 41.

In addition, the developing device 43 supplies the toner to the surface of the photoconductor 41 to thus develop the electrostatic latent image into a monochrome toner image. The developing device 43 supplies the toner to the photoconductor 41 at a developing position on an outer circumference of the photoconductor 41. The developing device 43 is an example of a developing portion.

The charging device 42 includes a charging member 421 and a charging voltage output device 422. The charging member 421 is disposed so as to oppose the photoconductor 41. The charging voltage output device 422 supplies a charging voltage to the charging member 421.

The charging voltage is supplied from the charging voltage output device 422 to the photoconductor 41 via the charging member 421. Thus, the surface of the photoconductor 41 is charged. The charging device 42 is an example of a charging portion.

The developing device 43 includes a developing roller 431 and a bias output device 432. The developing roller 431 is disposed so as to oppose the photoconductor 41 at the developing position. The developing roller 431 rotates while carrying toner.

The bias output device 432 supplies a developing bias voltage to the developing roller 431. In this embodiment, the bias output device 432 supplies the developing bias voltage obtained by superimposing an AC voltage to a DC voltage, to the developing roller 431.

The developing roller 431 rotates while carrying toner, and causes the toner to come into contact with the surface of the photoconductor 41 at the developing position. The developing roller 431 is an example of a developing member. The bias output device 432 is an example of a bias output portion.

The toner carried by the developing roller 431 is transferred to a portion of the electrostatic latent image on the surface of the photoconductor 41 by an electric field generated between the developing roller 431 and the photoconductor 41.

At the developing position, the toner is transferred from the developing roller 431 to the portion of the electrostatic latent image on the surface of the photoconductor 41. Thus, the electrostatic latent image is developed into the monochrome toner image. The four photoconductors 41 are each an example of an image-carrying member that carries a toner image.

In this embodiment, the developing device 43 performs development using a two-component development system. In other words, the developing device 43 causes the toner to be charged by stirring two-component developer including the toner and a carrier. In addition, the developing device 43 supplies the charged toner to the photoconductor 41.

The carrier is a granulated carrier having a magnetic property. For example, the carrier is a granulated magnetic body having a coated surface. The coating is formed of, for example, a synthetic resin such as an epoxy resin.

As described above, in the four image forming portions 4*x*, the four charging devices 42 and the four developing devices 43 respectively form the monochrome toner images on the surfaces of the four photoconductors 41. The four photoconductors 41 rotate while carrying the monochrome toner images on the surfaces thereof.

The transfer device 44 includes an intermediate transfer belt 441, four primary transfer devices 442 respectively corresponding to the four image forming portions 4*x*, a secondary transfer device 443, and a belt cleaning device 444.

The intermediate transfer belt 441 is supported by a plurality of supporting rollers 440. One of the plurality of supporting rollers 440 rotates by power from a motor (not shown). Thus, the intermediate transfer belt 441 rotates.

In the transfer device 44, the four primary transfer devices 442 transfer the monochrome toner images respectively formed on the surfaces of the four photoconductors 41 onto a surface of the intermediate transfer belt 441.

The intermediate transfer belt 441 rotates while carrying the plurality of monochrome toner images transferred from the four photoconductors 41. The intermediate transfer belt 441 is an example of an intermediate transfer member. The plurality of monochrome toner images are toner images of different colors.

By transferring the monochrome toner images of the plurality of colors onto the surface of the intermediate transfer belt 441 in a state where the toner images overlap one another, a synthetic toner image as a color image is formed on the surface of the intermediate transfer belt 441.

Each of the primary transfer devices 442 includes a primary transfer roller 4421 and a primary voltage output device 4422. The primary transfer roller 4421 is disposed so as to oppose the photoconductor 41 via the intermediate transfer belt 441.

The primary voltage output device 4422 supplies a primary transfer voltage to the primary transfer roller 4421. Thus, a primary transfer current flows between the primary voltage output device 4422 and the primary transfer roller 4421, and thus an electric field is generated between the photoconductor 41 and the primary transfer roller 4421.

The monochrome toner image formed on the surface of the photoconductor 41 is transferred onto the surface of the intermediate transfer belt 441 by the electric field generated between the photoconductor 41 and the primary transfer roller 4421.

In other words, the four primary transfer devices 442 respectively supply the primary transfer voltage to the four primary transfer rollers 4421 via the intermediate transfer belt 441. Thus, the four primary transfer devices 442 respectively transfer the monochrome toner images formed on the surfaces of the four photoconductors 41 onto the intermediate transfer belt 441.

The four primary transfer devices 442 are an example of a plurality of primary transfer portions. The four primary transfer rollers 4421 are an example of a plurality of primary transfer members.

The secondary transfer device 443 transfers the synthetic toner image formed on the intermediate transfer belt 441 onto the sheet 9. The secondary transfer device 443 is an example of a secondary transfer portion.

The secondary transfer device 443 includes a secondary transfer roller 4431 and a secondary voltage output device 4432. The secondary transfer roller 4431 is an example of a secondary transfer member.

The secondary transfer roller 4431 is in contact with the intermediate transfer belt 441 at a secondary transfer position on the sheet conveying path 30. At the secondary transfer position, the sheet 9 is passed through between the intermediate transfer belt 441 and the secondary transfer roller 4431.

The secondary voltage output device 4432 supplies a secondary transfer voltage to the secondary transfer roller 4431. Thus, a secondary transfer current flows between the secondary voltage output device 4432 and the secondary transfer roller 4431, and thus an electric field is generated between the intermediate transfer belt 441 and the secondary transfer roller 4431.

The toner images formed on the surface of the intermediate transfer belt 441 are transferred onto the sheet 9 by the electric field generated between the intermediate transfer belt 441 and the secondary transfer roller 4431.

In other words, the secondary transfer device 443 supplies the secondary transfer voltage to the secondary transfer roller 4431 opposing the intermediate transfer belt 441 via the sheet 9 at the secondary transfer position. Thus, the secondary transfer device 443 transfers the monochrome toner images of the plurality of colors, that have been formed on the surface of the intermediate transfer belt 441, onto the sheet 9.

The drum cleaning device 45 removes waste toner remaining on the surface of the photoconductor 41. The belt cleaning device 444 removes the waste toner remaining on the intermediate transfer belt 441. The waste toner is generated along with the formation of the toner images in the printing device 4.

The fixing device 46 heats and pressurizes the toner images on the sheet 9. Thus, the fixing device 46 fixes the toner images onto the sheet 9.

The operation device 801 is a device that accepts user operations. For example, the operation device 801 includes operation buttons and a touch panel.

The display device 802 is a device that displays information. For example, the display device 802 includes a panel display device such as a liquid crystal display unit.

[Configuration of Control Device 8]

Figure 2:
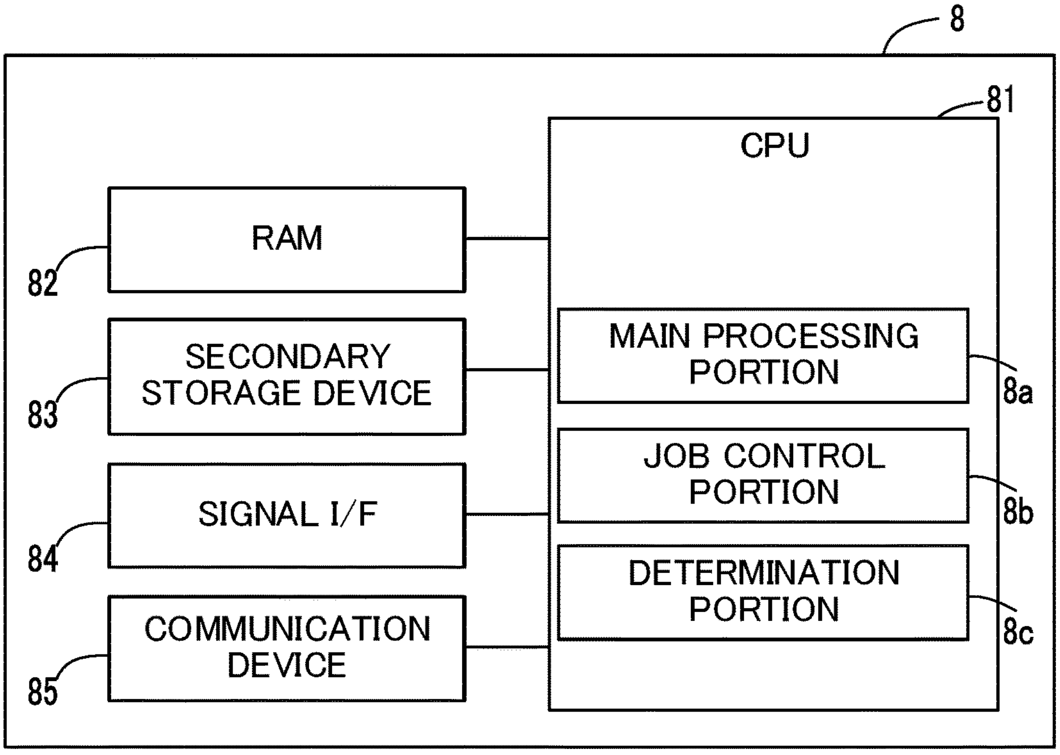
FIG. 2 is a block diagram showing a configuration of a control device in the image forming apparatus according to the embodiment.

As shown in FIG. 2, the control device 8 includes a CPU (Central Processing Unit) 81, a RAM (Random Access Memory) 82, a secondary storage device 83, a signal interface 84, a communication device 85, and the like.

The secondary storage device 83 is a nonvolatile computer-readable storage device. The secondary storage device 83 is capable of storing and updating computer programs and various types of data. For example, one of or both of a flash memory and a hard disk drive is/are adopted as the secondary storage device 83.

The signal interface 84 converts signals output from various sensors into digital data, and transmits the digital data obtained by the conversion to the CPU 81. In addition, the signal interface 84 converts a control command output by the CPU 81 into a control signal, and transmits the control signal to a control target apparatus.

The communication device 85 communicates with other devices such as a host device (not shown). The CPU 81 communicates with the other devices via the communication device 85.

The CPU 81 is a processor that executes various types of data processing and control by executing the computer programs. The control device 8 including the CPU 81 controls the sheet conveying device 3, the printing device 4, the display device 802, the communication device 85, and the like.

The RAM 82 is a volatile computer-readable storage device. The RAM 82 temporarily stores the computer programs to be executed by the CPU 81 and data to be output and referenced by the CPU 81 in a process of executing various types of processing.

The CPU 81 includes a plurality of processing modules that are realized by executing the computer programs. The plurality of processing modules include a main processing portion 8*a*, a job control portion 8*b*, and the like.

The main processing portion 8*a* executes processing of causing various types of processing to be started in response to operations made with respect to the operation device 801, control of the display device 802, and the like.

The job control portion 8*b* controls the sheet conveying device 3. Thus, the job control portion 8*b* controls the feed of the sheet 9 from the sheet storing portion 2 and the conveyance of the sheet 9 on the sheet conveying path 30.

Further, the job control portion 8*b* controls the printing device 4. The job control portion 8*b* causes the printing device 4 to execute the print processing in synchronization with the conveyance of the sheet 9 by the sheet conveying device 3.

The job control portion 8*b* generates print data based on print target image data. Further, the job control portion 8*b* causes the laser scanning unit 40 to execute processing of exposing the surfaces of the photoconductors 41 according to the print data. Thus, the laser scanning unit 40 forms the electrostatic latent image on the surfaces of the photoconductors 41.

In addition, the job control portion 8*b* is also capable of controlling the charging voltage, the developing bias voltage, the primary transfer voltage, and the secondary transfer voltage.

Incidentally, in the image forming apparatus 10, after being transferred onto the intermediate transfer belt 441 by one primary transfer device 442, each of the monochrome toner images excluding one out of the plurality of monochrome toner images passes through the other primary transfer devices 442.

A toner charging amount in the monochrome toner image formed on the surface of the intermediate transfer belt 441 varies as it passes through the primary transfer device 442.

Therefore, there is a fear that, by the plurality of monochrome toner images formed on the surface of the intermediate transfer belt 441 passing through one or more primary transfer devices 442, a toner charging amount of the synthetic toner image that has reached the secondary transfer position will fall outside an appropriate range. Thus, a transfer failure of the synthetic toner image from the intermediate transfer belt 441 to the sheet 9 may occur.

In the image forming apparatus 10, the plurality of processing modules further include a determination portion 8*c* (see FIG. 2). The determination portion 8*c* executes toner state determination processing to be described later (see FIG. 3). Thus, the toner state determination processing includes processing of determining a state of the toner charging amount in the toner image formed on the surface of the intermediate transfer belt 441.

The image forming apparatus 10 further includes a density sensor 5 used in the toner state determination processing (see FIG. 1). The density sensor 5 senses a toner density on the surface of the intermediate transfer belt 441 at a sensing position.

The sensing position is a position on a downstream side of the secondary transfer position in a rotation direction of the intermediate transfer belt 441. The density sensor 5 is, for example, CIS (Contact Image Sensor). The density sensor 5 is an example of a density sensing portion.

[Toner State Determination Processing]

Figure 3:
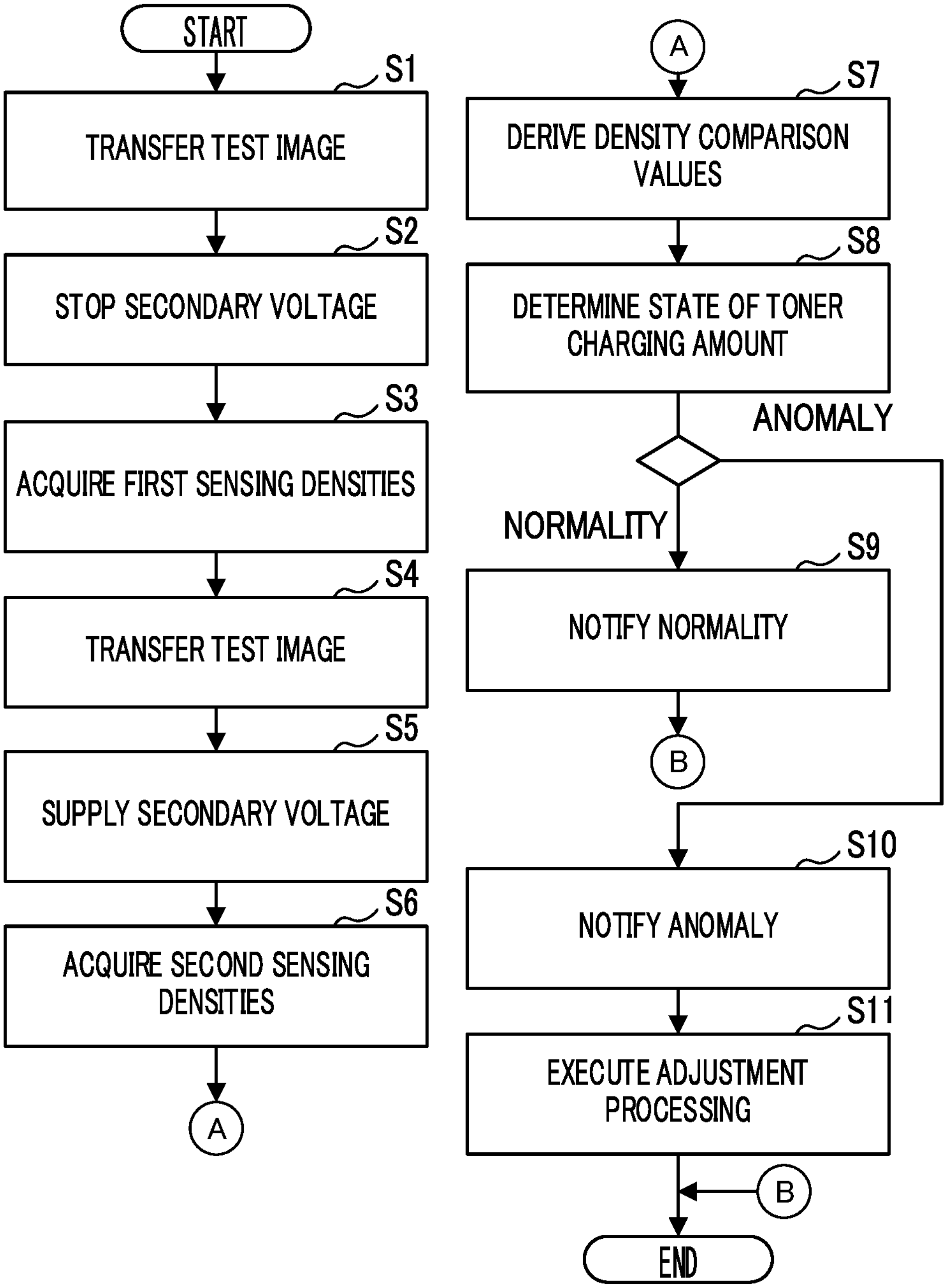
FIG. 3 is a flowchart showing exemplary procedures of toner state determination processing in the image forming apparatus according to the embodiment.

Hereinafter, exemplary procedures of the toner state determination processing will be described with reference to the flowchart shown in FIG. 3. The toner state determination processing is an example of processing for realizing a toner charging state determination method in the image forming apparatus 10.

When the main processing portion 8*a* senses a predetermined determination start operation with respect to the operation device 801, the determination portion 8*c* executes the toner state determination processing.

In descriptions below, S1, S2, . . . represent identification symbols of a plurality of steps in the toner state determination processing. In the toner state determination processing, processing of Step S1 is executed first.

<Step S1>

In Step S1, the determination portion 8*c* causes the printing device 4 to execute test image transfer processing.

Figure 4:
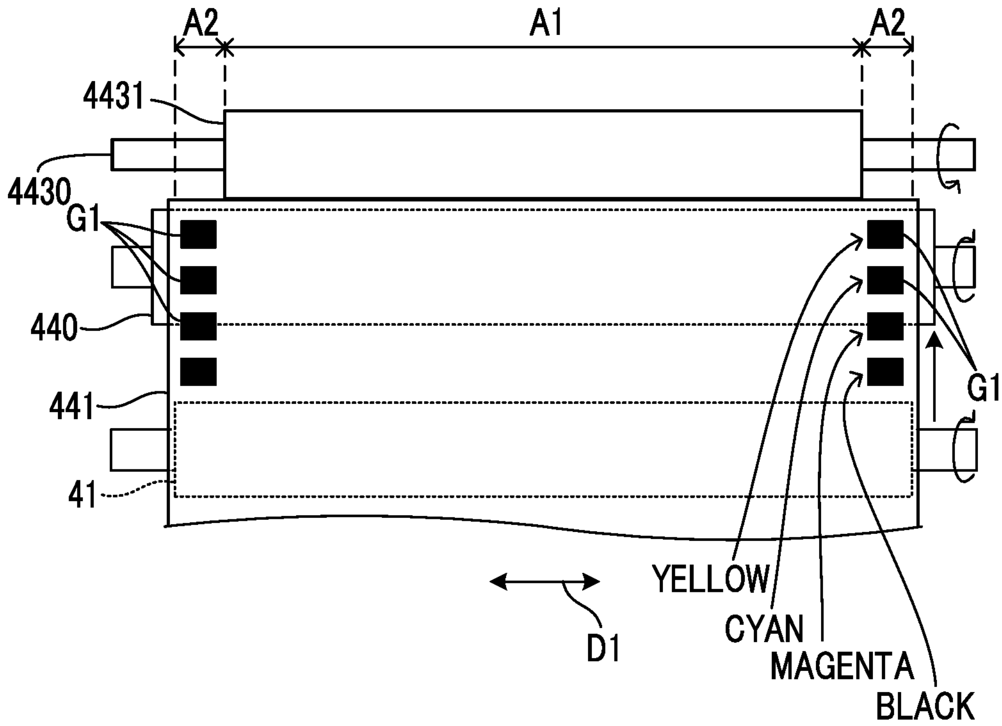
FIG. 4 is a diagram showing an example of test toner images formed on a surface of an intermediate transfer belt.

The test image transfer processing is processing of transferring a plurality of test toner images G1 onto non-transfer areas A2 on the surface of the intermediate transfer belt 441 from the surfaces of the plurality of photoconductors 41 (see FIG. 4).

The non-transfer areas A2 are areas outside a secondary transfer area A1 on the surface of the intermediate transfer belt 441. The secondary transfer area A1 is an area corresponding to a width of the secondary transfer roller 4431.

In other words, the secondary transfer area A1 is an area that comes into contact with the secondary transfer roller 4431 when the sheet 9 is not at the secondary transfer position. The non-transfer areas A2 are areas opposing a rotation shaft 4430 extending from ends of the secondary transfer roller 4431 in a width direction D1.

The secondary transfer roller 4431 rotates about the rotation shaft 4430. The width direction D1 is a direction along the rotation shaft 4430 and is a longitudinal direction of the secondary transfer roller 4431. Moreover, the width direction D1 is also a so-called main scanning direction.

Sizes of the photoconductors 41 and the intermediate transfer belt 441 in the width direction D1 are larger than a size of the secondary transfer roller 4431 in the width direction D1 (see FIG. 4). Moreover, a size of each of the primary transfer rollers 4421 in the width direction D1 is also larger than the size of the secondary transfer roller 4431 in the width direction D1 (not shown).

In this embodiment, at least four test toner images G1 are respectively formed on the surfaces of the four photoconductors 41, and at least four test toner images G1 are transferred onto the non-transfer area A2 on the surface of the intermediate transfer belt 441 from the four photoconductors 41.

FIG. 4 shows an example where four test toner images G1 are formed on one of the non-transfer areas A2 on both sides of the secondary transfer area A1, and four test toner images G1 are additionally formed on the other one of the non-transfer areas A2 on both sides of the secondary transfer area A1.

Each of the test toner images G1 is the monochrome toner image. The four test toner images G1 are transferred with intervals therebetween in the rotation direction of the intermediate transfer belt 441, in the non-transfer area A2 on the surface of the intermediate transfer belt 441.

Each of the test toner images G1 is, for example, a solid patch image. After executing the processing of Step S1, the determination portion 8*c* shifts the processing to Step S2.

<Step S2>

In Step S2, the determination portion 8c causes the secondary transfer device 443 of the printing device 4 to execute the secondary voltage stop processing.

The secondary voltage stop processing is processing of stopping the supply of the secondary transfer voltage to the secondary transfer roller 4431 at least when all of the test toner images G1 transferred in Step S1 pass through the secondary transfer position.

By executing the processing of Step S1 and Step S2, all of the test toner images G1 pass through the secondary transfer position and reach the sensing position under a situation where the secondary transfer voltage is not supplied to the secondary transfer roller 4431.

After executing the processing of Step S2, the determination portion 8c shifts the processing to Step S3.

<Step S3>

Figure 5:
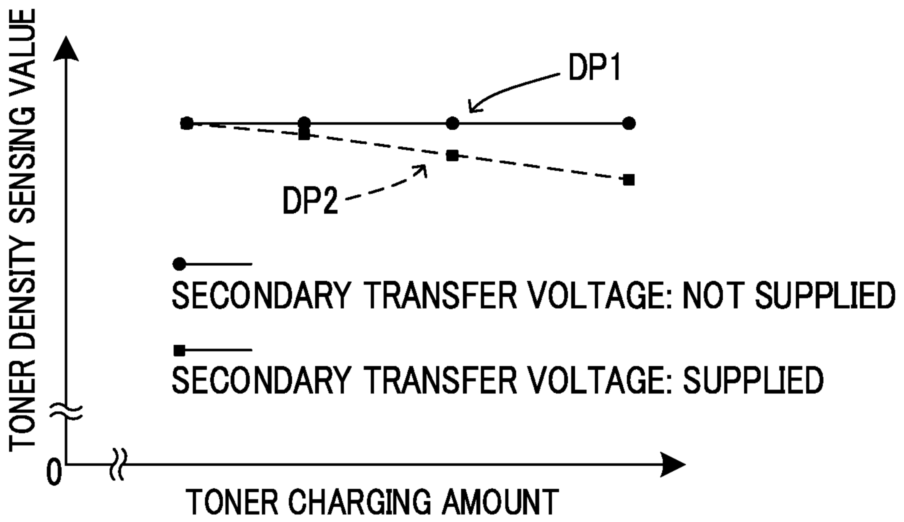
FIG. 5 is a graph showing a relationship between a toner charging amount and a toner density sensing value in a toner image formed on the surface of the intermediate transfer belt.

In Step S3, the determination portion 8c acquires a plurality of first sensing densities DP1 sensed by the density sensor 5 when the plurality of test toner images G1 pass through the sensing position (see FIG. 5).

The plurality of first sensing densities DP1 are sensing densities that are sensed by the density sensor 5 and correspond to the plurality of test toner images G1 that have passed through the secondary transfer position under a situation where the secondary voltage stop processing is being executed.

In this embodiment, four first sensing densities DP1 corresponding to the four toner colors are obtained. After executing the processing of Step S3, the determination portion 8c shifts the processing to Step S4.

<Step S4>

In Step S4, the determination portion 8c causes the printing device 4 to execute the test image transfer processing similar to Step S1.

After executing the processing of Step S4, the determination portion 8c shifts the processing to Step S5.

<Step S5>

In Step S5, the determination portion 8c causes the secondary transfer device 443 of the printing device 4 to execute the secondary voltage supply processing.

The secondary voltage supply processing is processing of supplying the secondary transfer voltage to the secondary transfer roller 4431 at least when all of the test toner images G1 transferred in Step S4 pass through the secondary transfer position.

By executing the processing of Step S4 and Step S5, all of the test toner images G1 pass through the secondary transfer position and reach the sensing position under a situation where the secondary transfer voltage is supplied to the secondary transfer roller 4431.

After executing the processing of Step S5, the determination portion 8c shifts the processing to Step S6.

<Step S6>

In Step S6, the determination portion 8c acquires a plurality of second sensing densities DP2 sensed by the density sensor 5 when the plurality of test toner images G1 pass through the sensing position.

The plurality of second sensing densities DP2 are sensing densities that are sensed by the density sensor 5 and correspond to the plurality of test toner images G1 that have passed through the secondary transfer position under the situation where the secondary voltage supply processing is being executed.

In this embodiment, four second sensing densities DP2 corresponding to the four toner colors are obtained. After executing the processing of Step S6, the determination portion 8c shifts the processing to Step S7.

It is noted that the processing of Step S1 to Step S3 may be executed after executing the processing of Step S4 to Step S6.

<Step S7>

In Step S7, the determination portion 8c derives four density comparison values corresponding to the four toner colors. The four density comparison values represent results of comparing the four first sensing densities DP1 and the four second sensing densities DP2 for the respective toner colors.

For example, each of the density comparison values is a difference between each of the first sensing densities DP1 and each of the second sensing densities DP2. Alternatively, each of the density comparison values may be a ratio between each of the first sensing densities DP1 and each of the second sensing densities DP2.

It is noted that the image forming apparatus 10 may include a plurality of density sensors 5. In this case, each of the density comparison values is derived based on an integrated value of the plurality of first sensing densities DP1 for each of the toner colors and an integrated value of the plurality of second sensing densities DP2 for each of the toner colors. For example, the integrated value is an average value or a sum value.

The two graphs shown in FIG. 5 each express a relationship between a toner charging amount and a toner density sensing value in a toner image formed on the surface of the intermediate transfer belt 441. The toner density sensing value is a sensing value sensed by the density sensor 5 when the toner image formed on the surface of the intermediate transfer belt 441 passes through the sensing position.

One of the two graphs expresses a relationship between the toner charging amount and the first sensing density DP1. The other one of the two graphs expresses a relationship between the toner charging amount and the second sensing density DP2.

The graphs of FIG. 5 express experimental results obtained under a situation where conditions of the printing device 4 except for the toner charging amount and whether or not the secondary transfer voltage is supplied are unified.

As shown in FIG. 5, the first sensing density DP1 is constant regardless of variations of the toner charging amount. On the other hand, the second sensing density DP2 decreases as the toner charging amount increases.

As described above, by the supply of the secondary transfer voltage to the secondary transfer roller 4431, an electric field is generated at the secondary transfer position. The electric field at the secondary transfer position acts as a force that separates the toner from the intermediate transfer belt 441 in the non-transfer area A2.

Further, as the toner charging amount in the non-transfer area A2 increases, an electrostatic force applied to the toner in the non-transfer area A2 by the electric field at the secondary transfer position becomes larger. Therefore, the second sensing density DP2 decreases as the toner charging amount increases.

Therefore, the toner charging amounts of the test toner images G1 in the non-transfer area A2 are reflected on the density comparison values. In this embodiment, the density comparison values are index values of the toner charging amounts in the monochrome toner images that have reached the secondary transfer position.

The processing of Step S7 is an example of processing of deriving an index value of the toner charging amount. After executing the processing of Step S7, the determination portion 8*c* shifts the processing to Step S8.

<Step S8>

In Step S8, the determination portion 8*c* determines states of the toner charging amounts of the test toner images G1 in the non-transfer area A2 based on the four density comparison values. The determination portion 8*c* determines the state of the toner charging amount for each of the image forming portions 4*x*.

Specifically, the determination portion 8*c* determines that the state of the toner charging amount is normal when the density comparison value falls within a predetermined reference range. On the other hand, the determination portion 8*c* determines that the state of the toner charging amount is anomalous when the density comparison value falls outside the reference range.

It is noted that the state of the toner charging amount being anomalous means that the toner charging amount is excessive.

When the state of the toner charging amount is determined to be normal, the determination portion 8*c* shifts the processing to Step S9. On the other hand, when the state of the toner charging amount is determined to be anomalous, the determination portion 8*c* shifts the processing to Step S10.

<Step S9>

In Step S9, the determination portion 8*c* executes normality notification processing. The normality notification processing is processing of notifying that the toner charging amount is normal via the information output device.

For example, in the normality notification processing, the determination portion 8*c* outputs a predetermined message via the display device 802. The display device 802 is an example of the information output device.

After executing the processing of Step S9, the determination portion 8*c* ends the toner state determination processing.

<Step S10>

Meanwhile, in Step S10, the determination portion 8*c* executes anomaly notification processing. The anomaly notification processing is processing of notifying that the toner charging amount is anomalous via the information output device.

For example, in the anomaly notification processing, the determination portion 8*c* outputs a predetermined message via the display device 802.

After executing the processing of Step S10, the determination portion 8*c* shifts the processing to Step S11.

<Step S11>

In Step S11, the determination portion 8*c* executes adjustment processing for setting the toner charging amount back to normal.

For example, in the adjustment processing, the determination portion 8*c* corrects the primary transfer voltage in one or more of the plurality of primary transfer devices 442. In this case, the determination portion 8*c* corrects the primary transfer voltage of the primary transfer device 442 related to the test toner image G1 having the toner charging amount determined to be anomalous.

Further, in the adjustment processing, the determination portion 8*c* may also execute toner refresh processing on one or more of the plurality of image forming portions 4*x*. In this case, the determination portion 8*c* causes the image forming portion 4*x* corresponding to the test toner image G1 having the toner charging amount determined to be anomalous, to execute the toner refresh processing.

The toner refresh processing is processing of discharging toner inside the developing device 43 to the photoconductor 41. In the toner refresh processing, the photoconductor 41, the charging device 42, the laser scanning unit 40, and the developing device 43 are operated.

Meanwhile, the primary transfer device 442 is controlled to be set to a state where a voltage having a reverse polarity from the normal primary transfer voltage is applied to the primary transfer roller 4421 or a state where the voltage is not applied to the primary transfer roller 4421. Thus, the toner discharged to the photoconductor 41 is collected by the drum cleaning device 45 without being transferred onto the intermediate transfer belt 441.

By executing the toner refresh processing, toner with a charging failure is consumed, and new toner is supplied to the developing device 43.

After executing the processing of Step S11, the determination portion 8*c* ends the toner state determination processing.

By executing the toner state determination processing, the state of the toner charging amount in the toner image formed on the surface of the intermediate transfer belt 441 is determined correctly. As a result, appropriate processing corresponding to the determination result on the state of the toner charging amount can be carried out.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A toner charging state determination method in an image forming apparatus including a printing portion which forms toner images on a sheet and a density sensing portion which senses a toner density, the toner charging state determination method comprising:

in a case where the printing portion includes

- a plurality of photoconductors which rotate while carrying the toner images on surfaces thereof,
- a plurality of primary transfer portions which respectively supply a primary transfer voltage to a plurality of primary transfer members opposing the plurality of photoconductors via an intermediate transfer member, to transfer the toner images formed on the surfaces of the plurality of photoconductors onto the intermediate transfer member,
- the intermediate transfer member which rotates while carrying the toner images transferred from the plurality of photoconductors, and
- a secondary transfer portion which supplies a secondary transfer voltage to a secondary transfer member opposing the intermediate transfer member via the sheet at a secondary transfer position, to transfer the toner images formed on a surface of the intermediate transfer member onto the sheet, and in addition, the density sensing portion senses the toner density on the surface of the intermediate transfer member at a sensing position on a downstream side of the secondary transfer position in a rotation direction of the intermediate transfer member, causing, by a processor, the printing portion to execute test image transfer processing for transferring a plurality of test toner images from the surfaces of the plurality of photoconductors onto an area outside a secondary transfer area corresponding to a width of the secondary transfer member on the surface of the intermediate transfer member, and secondary voltage stop processing for stopping the supply of the secondary transfer voltage to the secondary transfer member when the plurality of test toner images pass through the secondary transfer position;

acquiring, by the processor, a plurality of first sensing densities sensed by the density sensing portion when the plurality of test toner images that have passed through the secondary transfer position pass through the sensing position under a situation where the secondary voltage stop processing is being executed;

causing, by the processor, the printing portion to execute the test image transfer processing and secondary voltage supply processing for supplying the secondary transfer voltage to the secondary transfer member when the plurality of test toner images pass through the secondary transfer position;

acquiring, by the processor, a plurality of second sensing densities sensed by the density sensing portion when the plurality of test toner images that have passed through the secondary transfer position pass through the sensing position under a situation where the secondary voltage supply processing is being executed; and comparing, by the processor, the plurality of first sensing densities and the plurality of second sensing densities to determine a state of a toner charging amount in each of the plurality of test toner images corresponding to the plurality of primary transfer portions.

2. The toner charging state determination method according to claim 1, further comprising correcting, by the processor, the primary transfer voltage in a part or all of the plurality of primary transfer portions based on a result of the comparing of the plurality of first sensing densities and the plurality of second sensing densities.

3. The toner charging state determination method according to claim 1, further comprising causing, by the processor, the printing portion to execute, when the state of the toner charging amount is determined to be anomalous in one or more of the plurality of test toner images, toner refresh processing in one or more of the plurality of photoconductors corresponding to the toner charging amount determined to be anomalous.

4. The toner charging state determination method according to claim 1, further comprising executing, by the processor, anomaly notification processing via an information output device when the state of the toner charging amount is determined to be anomalous in one or more of the plurality of test toner images.

5. An image forming apparatus, comprising:

a processor which realizes the toner charging state determination method according to claim 1;

the printing portion which forms toner images on the sheet; and the density sensing portion which senses the toner density.

* * * * *